United States Patent
Giesel et al.

(10) Patent No.: US 6,928,347 B2
(45) Date of Patent: Aug. 9, 2005

(54) METHOD FOR ADAPTING SENSOR CELLS OF A SEAT MAT TO A MECHANICAL PRESTRESS

(75) Inventors: Ruediger Giesel, Stuttgart (DE); Rene Wolf, Schwieberdingen (DE); Reiner Marchthaler, Gingen (DE); Thomas Lich, Schwaikheim (DE); Frank Mack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 10/470,029

(22) PCT Filed: Jun. 12, 2002

(86) PCT No.: PCT/DE02/02146

§ 371 (c)(1),
(2), (4) Date: Jul. 22, 2003

(87) PCT Pub. No.: WO03/002371

PCT Pub. Date: Jan. 9, 2003

(65) Prior Publication Data

US 2004/0117141 A1 Jun. 17, 2004

(30) Foreign Application Priority Data

Jun. 27, 2001 (DE) .......................... 101 30 905

(51) Int. Cl.$^7$ ............................. B60N 2/00; B60R 21/01
(52) U.S. Cl. ........................................... 701/33; 701/34
(58) Field of Search ............................. 701/29, 33, 34, 701/45

(56) References Cited

U.S. PATENT DOCUMENTS

| 5,474,327 | A | 12/1995 | Schousek |
| 5,991,676 | A | 11/1999 | Podoloff et al. |
| 6,138,067 | A | 10/2000 | Cobb et al. |
| 6,546,817 | B1 * | 4/2003 | Aoki ............ 73/862.474 |
| 6,567,732 | B2 * | 5/2003 | Drobny et al. ......... 701/45 |

FOREIGN PATENT DOCUMENTS

| WO | WO 97/10115 | 3/1997 |
| WO | WO 01/62539 | 8/2001 |
| WO | WO 01/85497 | 11/2001 |
| WO | WO 02/14101 | 2/2002 |

* cited by examiner

Primary Examiner—Michael J. Zanelli
(74) Attorney, Agent, or Firm—Kenyon & Kenyon

(57) ABSTRACT

A method for adjusting the sensor cells of a seat mat to a mechanical stress caused by the installation of the seat mat in a vehicle seat, a diagnostic tester being connected to a control unit at the seat mat, and the diagnostic tester reads out the sensor values of the seat mat and compares them to setpoint values, in order then to transmit back correcting values to the control unit, which the control unit uses in further operation for calibrating the sensor values.

5 Claims, 2 Drawing Sheets

METHOD FOR ADAPTING SENSOR CELLS OF A SEAT MAT TO A MECHANICAL PRESTRESS

FIELD OF THE INVENTION

The present invention relates to adjusting sensor cells of a seat mat to a mechanical stress.

BACKGROUND INFORMATION

International Application Document No. WO 97/10115 discusses that one may adjust each sensor cell of a seat mat to a mechanical stress which is conditioned by the poor installation of the seat mat in a vehicle seat. Such a seat mat is used for determining whether there is a person on the vehicle seat, and what kind of sitting position this person has taken up, and also may be used to determine the weight of the person. These data are then used to activate an air bag.

SUMMARY OF THE INVENTION

The method according to the present invention for adjusting sensor cells of a seat mat to a mechanical stress may provide that the stress is ascertained by the manufacturer by using a diagnostic tester, and correcting data are derived from this, with which one configures the control unit, so that the measured values are corrected when the seat mat is in use. With this concept, seat mats may still be used, even with different installation conditions, provided the stress lies within given parameters, and the sensor cells are still able to measure a support pressure caused by a sitting person.

The correcting values may be stored in a memory of the control unit, so that in this memory, which is initialized at the beginning with null values, the correcting values are permanently available during the operating time of the control unit. Even in the case of the installation of a new seat mat, this memory may be overwritten with new correcting values.

When the diagnostic tester is connected to the control unit, first of all the diagnostic tester may be interrogated for a password, so that only one secured access to the control unit and for writing on the memory of the control unit may be allowed.

In addition, a diagnostic tester for performing the method may be present which includes a data transmission interface for connecting to the control unit, its own memory for the setpoint values, which in this case may be a permanent memory, and a processor for performing the comparisons between the setpoint values and the sensor values.

A control unit for performing the method according to the present invention may be present, which includes its own data transmission interface for connecting to the diagnostic tester and an additional data transmission interface for connecting to the seat mat, as well as a processor, such as a microcontroller, for evaluating the sensor values, and a memory for accommodating the correcting values.

DETAILED DESCRIPTION

The detection of people in the vehicle is a task gaining in importance for restraint system. It is important to determine for which person an air bag may be used and for which it may not. In this context, adaptively set air bags may trigger this air bag in the case of a collision, and a triggering situation resulting from this, as a function of the weight of the person. This seeks to achieve that an optimum restraint force is exerted on the person to be protected. Besides optical and ultrasound sensors, weight sensors are also used, and, in that connection especially a seat mat including sensor elements, each sensor element being configured as a pressure-sensitive resistor. These sensor elements are arranged in a matrix which is interrogated cyclically by a control unit used for this seat mat. The individual sensor elements have a lower resistance the higher the pressure exerted on them. Seating profiles may be created, using these sensor elements, which give out information on how the respective person sits. By the installation of a seat mat into a vehicle seat, different mechanical stresses are exerted on the individual sensor elements due to the various structural conditions of the vehicle seat.

According to the present invention, it is now checked by the manufacturer after installation, using a diagnostic tester, what sensor values the individual sensor elements have without a load on the seating surface, in order to derive correcting values from this, which offer a compensation for such mechanical stresses caused by the installation, and are then used as correcting values during operation.

Figure 1:
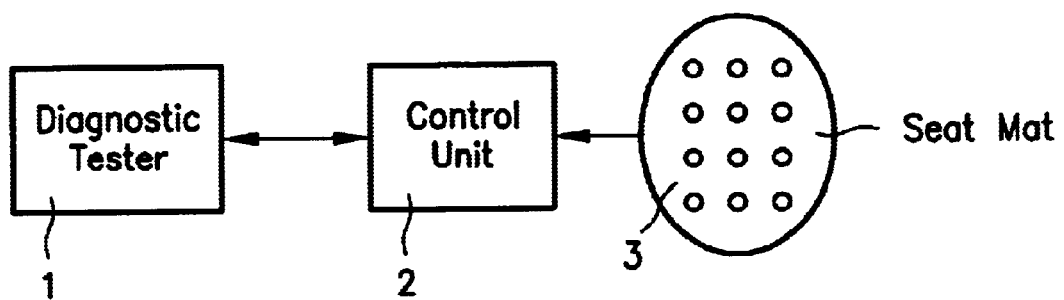
FIG. 1 shows a block diagram of the diagnostic tester and the control unit according to the present invention.

In FIG. 1, that configuration is shown as a block diagram in which a diagnostic tester is connected to a control unit which is connected to a seat mat. A diagnostic tester 1 is connected to a control unit 2 for a seat mat, via a data input/output. At a data input of control unit 2, a seat mat 3, including various sensor elements that are shown as circles here, is connected. Via additional data inputs and outputs, not shown here, control unit 2, is connected, for example, via a bus to other vehicle components such as a restraint system, in order to transmit the seat mat data, that is, the sensor values, to these vehicle components in raw and/or evaluated form.

Figure 3:
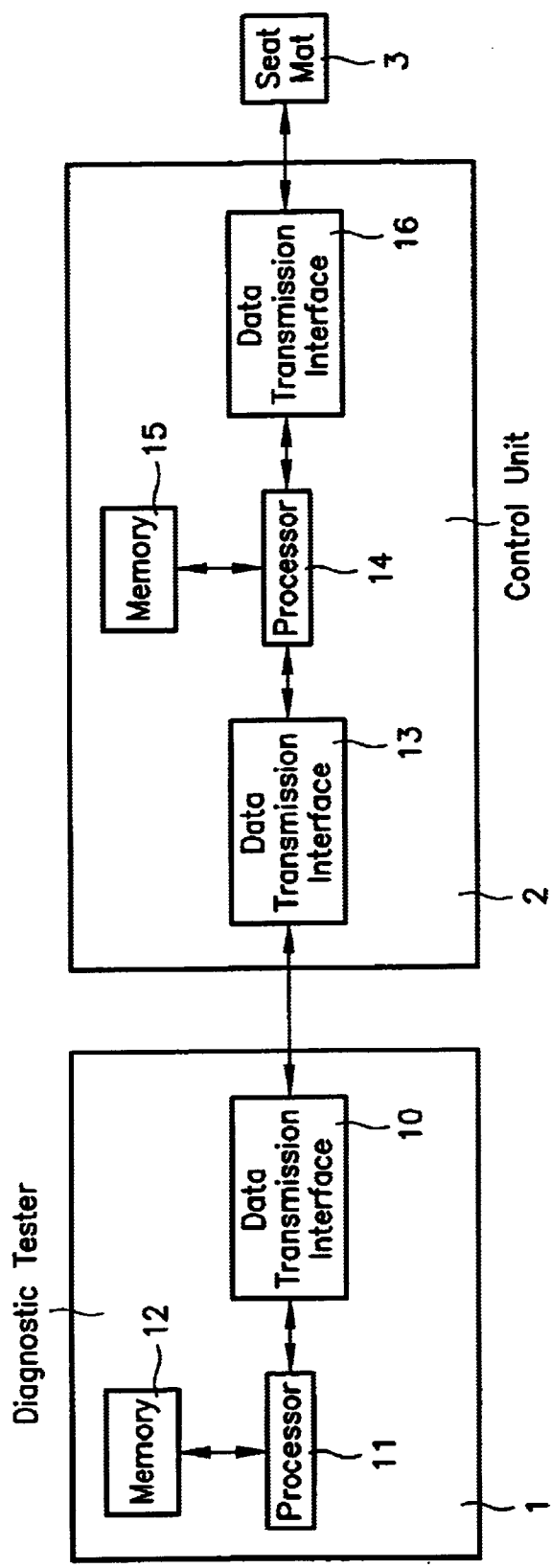
FIG. 3 shows the inner construction of a diagnostic tester and of a control unit.

In the form of a block diagram, FIG. 3 shows the inner construction of diagnostic tester 1 and of control unit 2. Diagnostic tester 1 includes a data transmission interface 10, via which diagnostic tester 1 is connected to control unit 2. Data transmission interface 10 is connected to a processor 11 of diagnostic tester 1 via a data input/output. Processor 11 is connected to a memory 12 via a second data input/output. The setpoint values and the password are stocked up in memory 12. Processor 11 is used for comparing setpoint values with sensor values and for evaluating the password interrogation.

Data transmission interface 10 is used for performing the data transmission between diagnostic tester 1 and control unit 2. Control unit 2 includes a first data transmission interface 13, a memory 15 and a processor 14, which here is a microcontroller. Data transmission interface 13 is connected to data transmission interface 10 of diagnostic tester 1 via a first data input/output. Data transmission interface 13 is connected to processor 14 via a second data input/output. Processor 14 is connected to memory 15 via a data input/output. At a third data input/output, processor 14 is connected to data transmission interface 16. Data transmission interface 16 connects control unit 2 to sensor mat 3 via its second data input/output. Memory 15 is used for stocking up the password and the correction values for the sensor values. Processor 14 performs the correction of the sensor values before they are processed further. Data interfaces 13 and 16 are used for data transmission involving diagnostic tester 1 and sensor mat 3.

Figure 2:
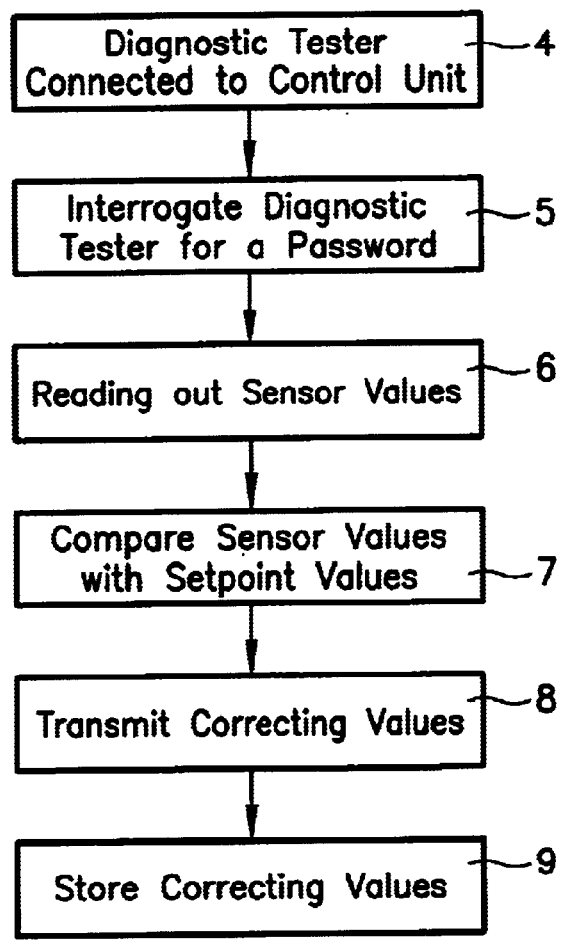
FIG. 2 shows a flowchart of the method according to the present invention.

In FIG. 2, the method according to the present invention is represented as a flow chart. In method step 4, diagnostic tester 1 is connected to control unit 2, specifically by the connection via data transmission interfaces 10 and 13. After initialization of the data transmission connection between diagnostic tester 1 and control unit 2, control unit 2 interrogates diagnostic tester 1 for a password, and terminates the method if the password of the diagnostic tester is not correct.

However, if the password is correct, then, in method step 6, the reading out of the sensor values of sensor mat 3 by diagnostic tester 1 is performed. In method step 7, processor 11 now makes a comparison of the sensor values with setpoint values, which processor 11 loads from memory 12. The difference between the setpoint values and the sensor values are then transmitted by diagnostic tester 1 to control unit 2 as the correcting values. Processor 14 stores these correcting values in memory 15 in method step 9. During the operation of sensor mat 3, processor 14 then corrects the sensor values read out from sensor mat 3, and the correcting values in memory 15. Thus the correcting values are used for calibrating the sensor values. The method is applied to an unloaded seating surface, so that only mechanical tensions conditioned on the installation of sensor mat 3 influences the sensor cells.

What is claimed is:

1. A method to adjust sensor cells of a seat mat to a mechanical stress caused by installing the seat mat in a vehicle seat, a diagnostic tester being connected to a control unit for the seat mat, the method comprising:

reading out sensor values of the sensor cells by the diagnostic tester via the control unit;

comparing the sensor values with setpoint values by the diagnostic tester;

determining correcting values as a function of the comparing; and transmitting the correcting values for the sensor values to the control unit to adjust the sensor cells.

2. The method of claim 1, wherein the correcting values are stored in a memory of the control unit.

3. The method of claim 1, further comprising:

performing a password interrogation by the control unit to the diagnostic tester before transmitting the sensor values from the control unit to the diagnostic tester.

4. The method of claim 1, wherein the diagnostic tester includes a data transmission interface to connect to the control unit, a memory for the setpoint values and a password, and a processor to perform the comparing between the setpoint values and the sensor values.

5. The method of claim 1, wherein the control unit includes a data transmission interface to connect to the diagnostic tester, another data transmission interface to connect to the seat mat, a processor to evaluate the sensor values and a memory to accommodate the correcting values.

* * * * *